United States Patent [19]

Kallenberg et al.

[11] Patent Number: 4,847,645

[45] Date of Patent: Jul. 11, 1989

[54] IMAGE PROJECTORS WITH PIVOTING MIRROR IN FRONT SCREEN PROJECTION SYSTEM

[75] Inventors: Karl J. Kallenberg, Richfield; Ronald B. Harvey, Minneapolis, both of Minn.

[73] Assignee: Lifetouch National School Studios Inc., Minneapolis, Minn.

[21] Appl. No.: 152,070

[22] Filed: Feb. 4, 1988

[51] Int. Cl.[4] ...................... G03B 29/00; G03B 21/26
[52] U.S. Cl. ..................................... 354/77; 354/291; 362/12; 353/28
[58] Field of Search ................... 354/77, 290, 291, 78; 353/28, 29; 355/70, 71; 352/89; 362/12

[56] References Cited

U.S. PATENT DOCUMENTS

| | | | |
|---|---|---|---|
| 2,727,427 | 12/1955 | Jenkins | 352/89 |
| 2,727,429 | 12/1955 | Jenkins | 352/89 |
| 3,322,487 | 5/1967 | Renner | 354/291 X |
| 3,911,450 | 10/1975 | Schwartz | 353/28 X |
| 4,422,745 | 12/1983 | Hopson | 354/105 |

Primary Examiner—L. T. Hix
Assistant Examiner—David M. Gray
Attorney, Agent, or Firm—Kinney & Lange

[57] ABSTRACT

A projector with two levels of illumination for projecting images from a film transparency is disclosed. Monitoring circuitry configures the level projector for the appropriate lead of illumination depending upon an operator request for preview illumination or a heightened level of illumination for exposure of a photograph of a composite optical image including the projected image. The monitoring circuitry also prevents excessive duration of illumination at the preview level.

14 Claims, 3 Drawing Sheets

IMAGE PROJECTORS WITH PIVOTING MIRROR IN FRONT SCREEN PROJECTION SYSTEM

CROSS REFERENCE TO RELATED APPLICATIONS

An improved projector alignment mechanism used in the Front Screen Projection System of the present invention is shown in U.S. application Ser. No. 152,249 by Karl Kallenberg, filed concurrently herewith, the disclosure of which is hereby incorporated by reference.

An improved slide holder for use in the projector of the present Front Screen Projection System is shown in U.S. application Ser. No. 152,647 by Karl J. Kallenberg filed concurrently herewith, the disclosure of which is hereby incorporated by reference.

BACKGROUND OF THE INVENTION

1. Field of the Invention

The present invention relates to an apparatus for the production of composite optical images from projected images and real objects. More particularly, it relates to an apparatus providing at least two illumination levels for the projected images used as backdrop scenery in the composition of photographs, particularly portrait photographs.

2. Description of the Prior Art

Front screen projection is a technique wherein composite optical images of real objects and projected images are generated. In still photography, it is typically desired to make a photograph of a subject such as a person in front of what appears to be a background of scenery. Of course, actual scenery could be constructed, but this is expensive and limits the flexibility of the photographer in composing a pleasing and interesting image. Providing a reflecting screen whereby any one of a number of scenery backgrounds may be projected as a backdrop for the composite image is known.

However, enhancement of the background image to provide a realistic looking scenery effect has remained an illusive goal outside of the studio environment. A major problem has been avoiding wash out of the projected background image with either the supplementary lighting used to fill the subject matter of the photograph or by environmental lighting which cannot be avoided or turned off by the photographer.

Such considerations have generally limited the use of front screen projection systems to a studio environment. In a studio environment all lighting is subject to control and careful alignment to avoid washing out the projected image. While technically feasible, the advantages of front screen projection have not been conveniently available, for example, in school portrait photgraphy. A professional photographer could advantageously use a front screen projection system which is portable enough to be transported outside of the studio environment and yet provides high quality composite images for recording.

SUMMARY OF THE INVENTION

The present invention is a portable front screen projection system which provides an image projector which generates appropriate illumination levels to overcome the adverse effects of environmental lighting formed outside of a studio environment.

The present invention overcomes the deficiencies noted in the prior art described above by providing an improved projector which generates two levels of illumination for first previewing a composite subject for a photograph and second for exposure of the actual photograph. Recent advances in reflecting screen technology have not been fully exploited by front screen projection systems. Highly directional reflective screens now reflect projected images in a very narrow solid angle. Accordingly, an increased percentage of the light reaching the reflecting screen may be returned to the camera recording the composite image. Fill lights used to illuminate a subject strike the highly directional screen at angles off the optical axis of the camera and the reflected image and thus have less of an adverse effect on the reflected image than previously. Further, filter curtains have become available to be placed between the subject of the photograph and the reflective screen, to reduce the amount of light reaching and being reflected by the screen from lighting not being used for the projected image.

However, such free hanging filters also adversely effect the intensity of the projected image. Accordingly, increased illumination of the projected image is required. Unfortunately, prior art projectors already generate enough heat in conjunction to the generation of light to risk damage to film tranparencies on which the backdrop images are recorded.

A preferred embodiment of the apparatus of the present invention provides a modified light channel for providing illumination for film transparencies used in front screen projection systems. A microprocessor based control system is provided to exploit adaptable features of the light channel. For example, the control system can change the configuration of the light channel to gather more light to project the image or to cut off illumination from the light channel to protect the film transparency from excessive exposure to light. Additionally, the control system can detect failures in the projector during the exposure of a photograph which would result in the production of a ruined photograph. Among other functions, the control system monitors a strobe which is used to illuminate the film transparency during exposure of a photograph to ensure that the strobe fired at the appropriate time. The control system also monitors a pivoting mirror, used for reinforcing light generated by the strobe, to ensure that the mirror reaches the appropriate position before exposure or photograph is allowed.

The apparatus of the invention also times the duration of preview modes during which film transparencies are illuminated by the preview lamp. Excessive illumination is prevented by the control system by turning off the preview lamp and allowing the mirror to pivot to its closed position.

The objects, features and advantages of the present invention will become more apparent from the following detailed description of a preferred embodiment which proceeds with reference to the accompanying drawings.

DETAILED DESCRIPTION OF THE PREFERRED EMBODIMENT

Figure 1:
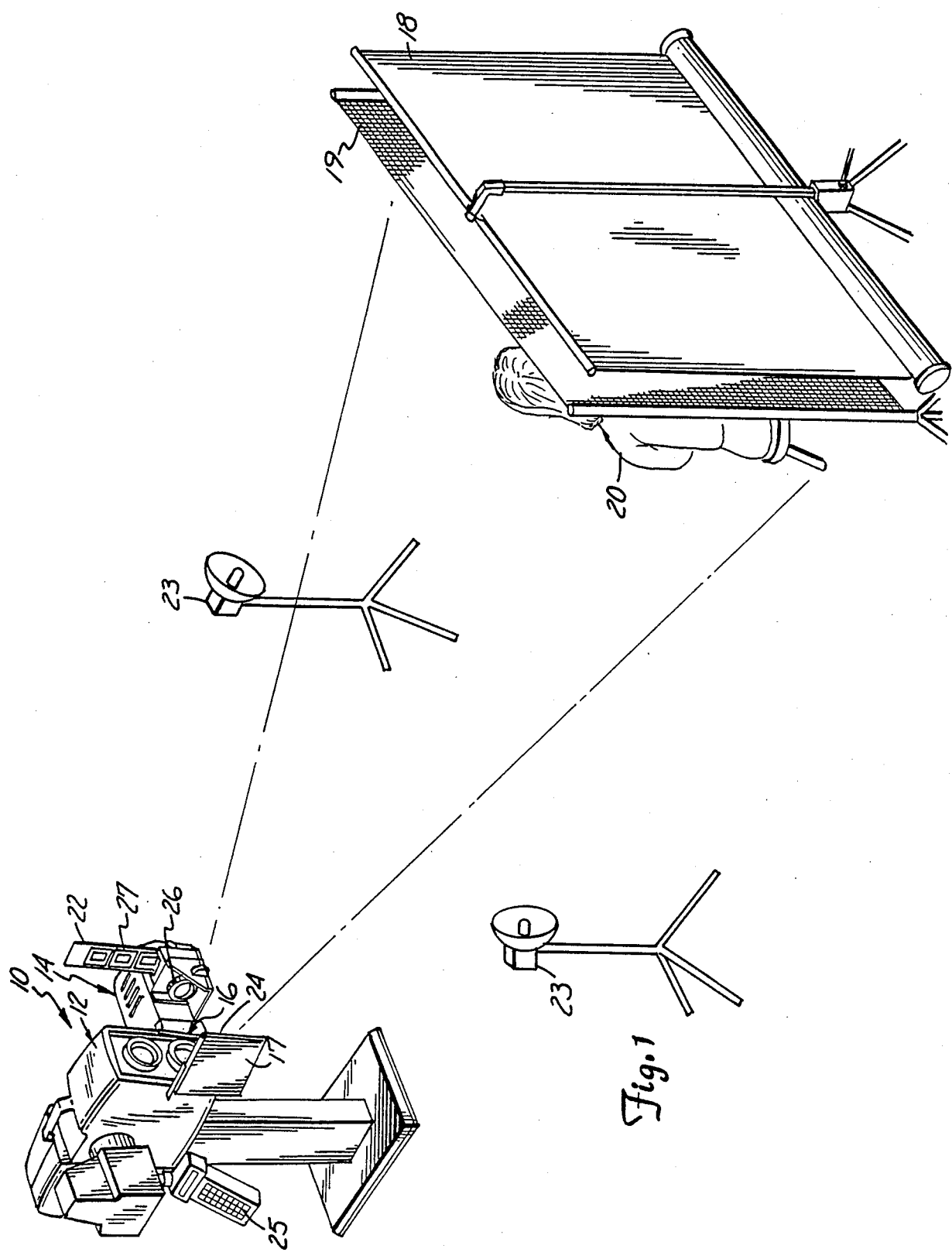
FIG. 1 is a perspective view of a front screen projection system with improved projector in accordance with the present invention.

FIG. 1 illustrates a front screen projection system 10. Front screen projection system 10 includes a still camera 12 for recording photographic images of composite optical images and a projector 14 for producing the backdrop scenery images for the composite optical image. A beam splitter 16 places a projected image from projector 14 onto the same optical axis as camera 12. An optical baffle 17 absorbs that portion of the projected image which is not reflected off the beam splitter so that no splash effects reach the objective lens of camera 12.

A highly directional reflective screen 18 reflects the image projected by projector 14 back to camera 12 in a narrow solid angle. The images projected on screen 18 may be of natural settings or interesting man-made environments. A black mesh screen 19 is placed immediately in front of screen 18 to act as a filter. A photographic subject 20 is placed in front of screen 18 and mesh 19 where it is illuminated by fill lamps 23. The directional nature of screen 18 and black mesh filter 19 limit the amount of light from fill lamps 23 and from environmental lighting reflecting off screen 18 back to camera 12. It is apparent that projector 14 must illuminate the image with sufficient intensity to allow camera 12 to record the background image despite the image having passed through black mesh screen 19 twice and beam splitter 16 once. The film transparency in projector 14 will be illuminated by a strobe during exposure of the photograph. Highly directional reflecting screen 18 and black mesh filter 19 are commercially available and do not form a part of the improvement of the present invention.

Projector 14 is attached to camera 12 so that the optical axes of the units are coplaner. Beam splitter 16 is adjusted to make the projected optical axes of projector lens 26 and camera objective lens 24 coaxial from where the projected image is reflected off beam splitter 16 toward reflecting screen 18 and from there back to camera 12. A controller 25 is accessible from the side of camera 12. Illumination of a selected film transparency 27 from slide carrier 22 in projector 14 is provided by an improved light channel 28 (shown in FIG. 3).

Figure 2A:
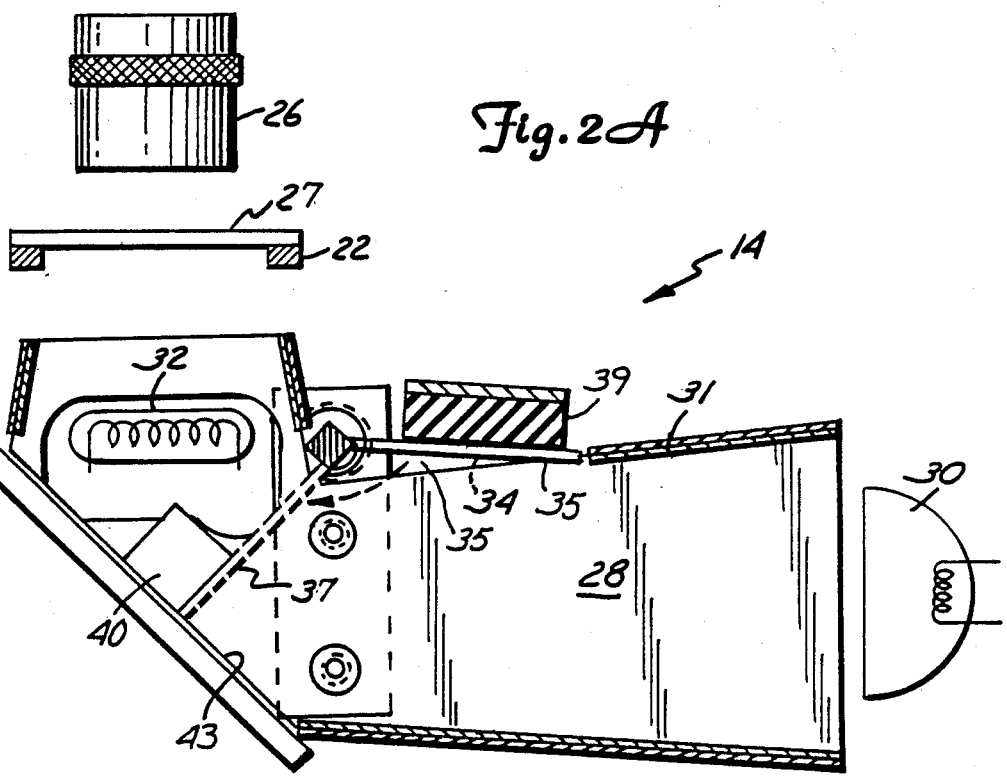
FIG. 2A is a schematic diagram of the light channel of the improved projector of the present invention.

FIG. 2A illustrates cooperation of elements of light channel 28 in projector 14. A film transparency holder 22 supports a selected film transparency 27 at a fixed location relative to light channel 28 and projector lens 26. When a film transparency has been selected, projector lens system 26 is adjusted to bring a projected image into focus on reflective screen 18. A preview lamp 30 is disposed at the opposite end of light channel 28 from the selected film transparency 27. Light channel 28 couples light from preview lamp 30 to film transparency 27. The interior of walls 31 of light channel 28 are mirrored to reduce light absorption. Light channel 28 also includes a cold mirror 43. Cold mirror 43 allows long wave length light such as infrared light to pass while reflecting shorter wave lengths. This protects film transparency 27 from excessive heat. Preview lamp 30 may be a conventional tungsten-halogen filament projection lamp. The improved light channel 28 couples luminous flux from preview lamp 30 to selected film transparency with greater efficiency than the prior art.

At the opposite end of light channel 28 from preview lamp 30 is a strobe 32. Strobe 32 is located in close physical proximity with the film transparency holder 22. A portion of the interior light channel wall 31 comprises a pivotable mirror 34 which swings out from position 35 in wall 31 to position 37 (indicated by dashed lines) in light channel 28. At position 37 the reflecting face of pivotable mirror 34 will be disposed behind strobe 32 to gather light generated by strobe 32 and direct it toward film transparency 27. In position 37, or the closed position, light from preview lamp 30 is prevented from reaching film transparency 27. Mirror stops 39 and 40 are set at the proper open and closed positions for pivotable mirror 34. A solenoid 38 (shown in FIG. 2B) is provided to move pivotable mirror 34 upon the appropriate command. As may be seen by reference to the drawing, when pivotable mirror 34 is open, light from preview lamp 30 is transmitted through strobe 32 to the selected film transparency to illuminate the transparency. Strobe 32 does not block significant amounts of light from reaching film transparency.

Figure 2B:
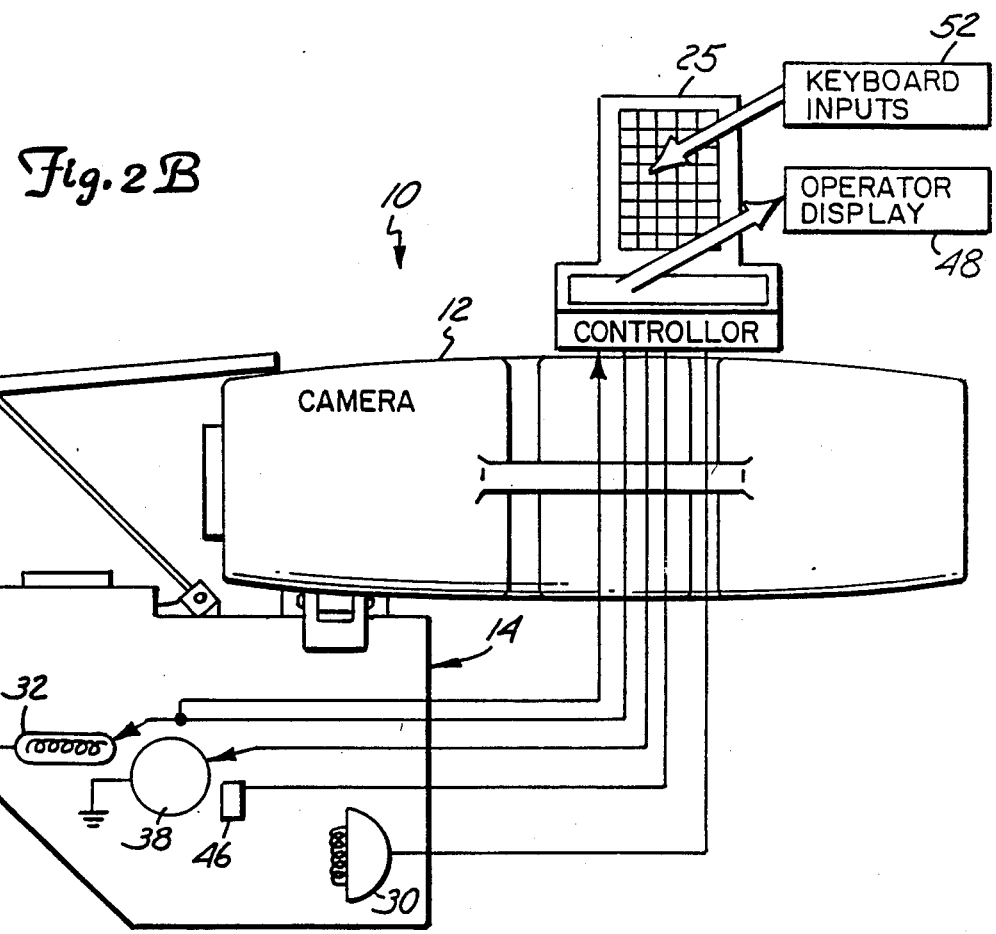
FIG. 2B is a control schematic for the improved projector and for the front screen projection system of the present invention.

FIG. 2B illustrates the control mechanisms for the present invention. Front screen projection system 10 includes camera 12, projector 14 and a controller 25. Control outputs and sensing inputs are depicted between controller 25 and projector 14. Controller 25 also monitors and transmits control signals to camera 12. With respect to camera 12, such control outputs as shutter open, shutter close and film advance may be given. Camera 12 also generates signals indicating shutter position and movement.

Controller 25 provides a firing signal on a control line to fire strobe 32 in projector 14 and monitors a sense input to determine whether the strobe drive line has gone low indicating strobe 32 has fired. Fill lamps 23 may also be connected to the strobe drive line and monitored in the same fashion. Controller 25 also provides control inputs to solenoid 38. A signal is transmitted to controller 25 through mirror position sensing switch 46 to indicate whether or not the pivotable mirror is closed. Preview lamp 30 is also turned on or off by controller 25. Controller 25 times periods when the pivotable mirror is not closed and lamp 30 is on, indicating that a selected film transparency 27 is being illuminated by the preview lamp. Controller 25 closes pivotable mirror 34 and turns preview lamp 30 off to protect film transparency 27 from excessive exposure.

An operator interacts with controller 25 through key pad 52. Controller 25 displays various error messages and status updates on a display 48.

Figure 3:
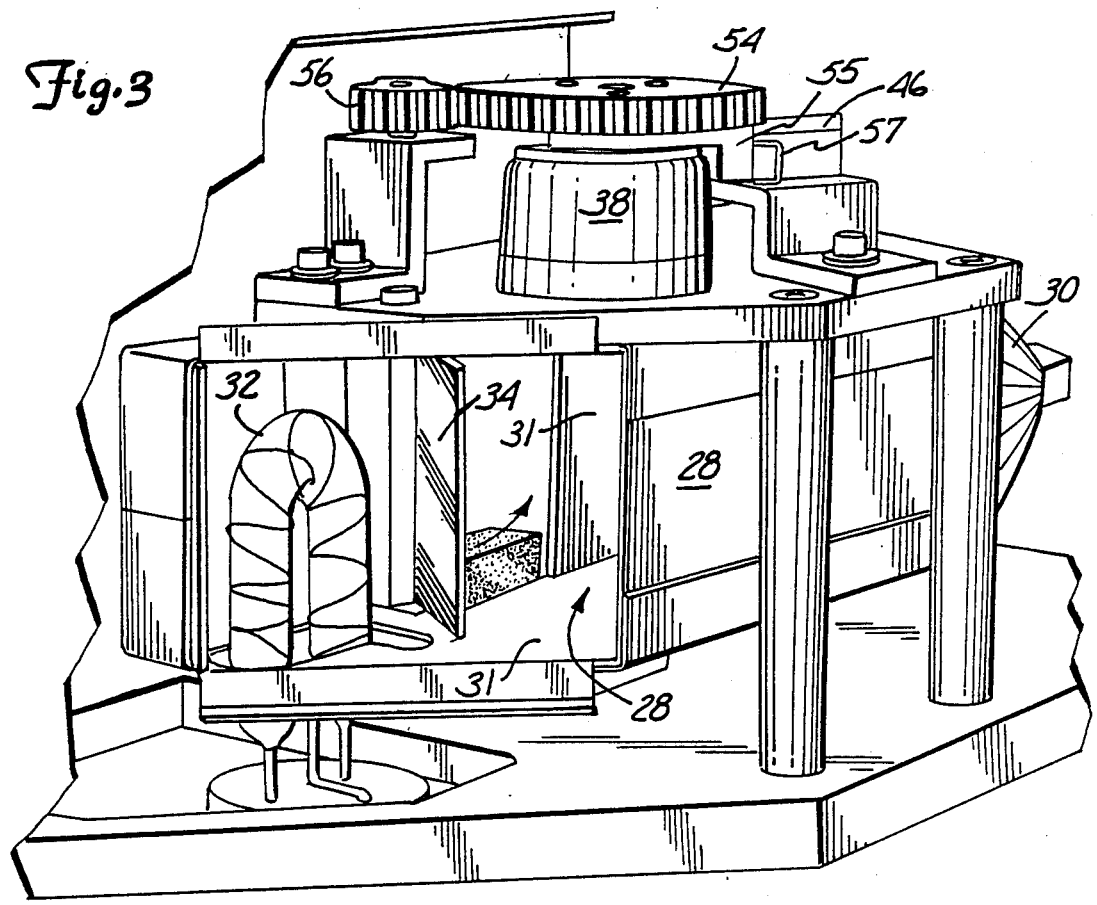
FIG. 3 is a cutaway side view of the light channel of the present invention.

FIG. 3 illustrates the structural elements of a portion of the light channel 28 with cold mirror 43 shown as removed. Strobe 32, located in the mouth of light channel 28, is a conventional flash tube. The light channel walls 31 are mirrored to intensify and direct light generated by the flash tube out of the mouth of the light channel. Pivot mirror 34, when closed, abuts against the removed cold mirror 43 to provide a closed, mirrored backdrop behind strobe 32 to reflect substantially all light generated by strobe 32 forward out of the mouth of light channel 28. When pivot mirror 34 is in the opened position 35, it merges with wall 31 to reflect light from preview lamp 30 out of the mouth of light channel 8. Pivotable mirror 34 swings into and out of light channel 28 around a vertical axis in the wall of light channel 28. Rotary solenoid 38 provides mechanical action to drive the pivoting action of pivot mirror 34. Transfer gear 54 and drive gear 56 couple the mechanical action of solenoid 38 to the axis of pivot mirror 34 to effect rotation of pivot mirror 34. The gear ratios of gears 54 and 56 are chosen to substantially accelerate the rotation of mirror 34.

Figure 4:
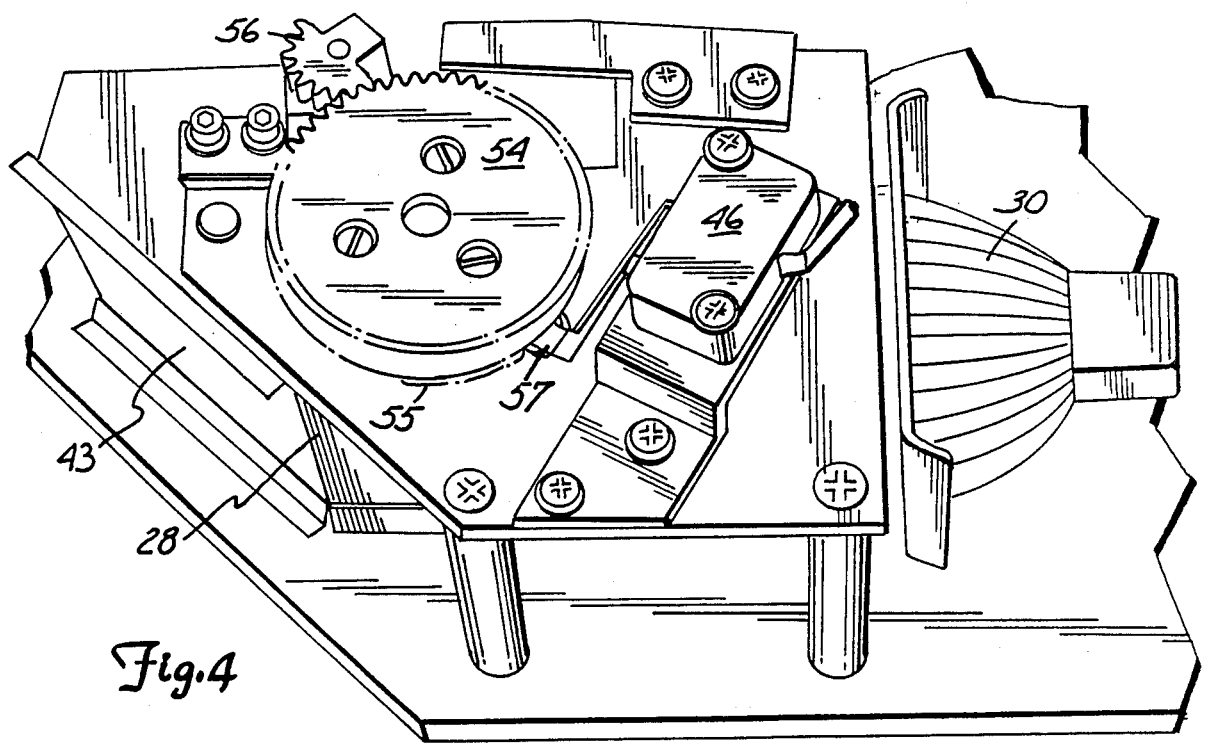
FIG. 4 is a top view of the light channel.

FIG. 4 illustrates the operational mechanisms of light channel 28. Cam 55 is located on solenoid 38 to rotate with transfer gear 54. Cam position sensor 57 is disposed to cooperate with cam 55 to actuate mirror position sensing switch 46. Cam 55 is coupled to mirror 34 through gears 54 and 56, and its position indicates the position of mirror 34. Preview lamp 30 is oriented to shine into light channel 28. Light channel 28 allows two separate sources of illumination to be used without substantial loss of the luminous flux from either source. The construction of light channel 28 also allows, as is more fully elaborated upon hereinafter, projector 14 to be operated in a fashion protective of film transparencies.

The operation of the present invention will now be described. Front screen projection system 10 has two working modes, a preview mode and a picture taking mode. It will be understood that in the preview mode, light channel 28 provides sustained, lower level illumination of a film transparency. In the preview mode, preview lamp 30 illuminates selected film transparency 27 for a sustained period to allow the photographer to consider the composite optical image. In the picture-taking mode, light channel 28 will be configured to illuminate a selected film transparency 27 by strobe 32 at a high intensity. Controller 25 coordinates operation of still photograph camera 12 and projector 14 in the picture-taking mode. In normal use, a plurality of preview modes would occur as the operator tried various backgrounds and poses for the composite image. However, only a single preview mode will be described below in conjunction with operation of the system.

The preview mode allows the operator to inspect the composite image without making a photograph. Accordingly, preview mode lighting intensities are considerably below those of the picture taking mode.

An operator may indicate on key pad 52 that front screen projection system 10 should enter the preview mode. Controller 25 turns preview lamp 30 on and transmits a signal to solenoid 38 to move pivoting rest or mirror 34 into the light channel wall from its closed position 37. Cam 55 will engage sensor 57 causing mirror position switch 46 to transmit a signal to the controller 25 to indicate whether mirror 34 has moved out of the light channel 28 into the light channel wall. If pivotable mirror 34 does not move out of light channel 28, an error message will be displayed on the display 48. This signal will not be generated, however, until the preview mode has been exited or a picture has been taken.

As indicated above, preview lamp 30 illuminates selected film transparency 27 allowing the image recorded on film transparency 27 to be projected onto a directional reflecting screen 18. This will permit the operator to preview the selected background with the subject 20, and to position subject or subjects 20 appropriately for the background. The preview period is limited by controller 25 to a maximum of ten seconds. If ten seconds expires while projector 14 is still in the preview mode configuration, controller 25 disables solenoid 38 to close light channel 28 and turns preview lamp 30 off. This is done to protect selected film transparency 27 from excess heat. The preview mode may also be exited by entering the picture-taking mode or by a specific preview cancel command on key pad 52. At this stage, the preview mode may be immediately reentered. If a second preview period occurs within ten seconds of the end of the previous preview mode, then controller 25 will enforce a ten second wait period before a third preview mode may be entered. The second preview mode is also limited to ten seconds by controller 25.

Entry to the picture taking mode is not affected by the system being in the preview mode. The picture taking mode is entered by tripping the shutter of camera 12. Upon tripping of the shutter, an indication signal is transmitted to controller 25. Controller 25 then relaxes any signal to solenoid 38 to close light channel 28 of projector 14. Controller 25 monitors camera 12 for indication that the camera shutter is in fact opening. The shutter status indication signal is high if the shutter is moving, and is low if the shutter is either opened or closed. The shutter sensor signal is checked once every 300 microseconds for up to twelve milliseconds for shutter movement indication. If such a signal is not received, controller 25 will conclude that the shutter is not opening and will abort picture taking sequence and display an error message on display 48.

After receiving indication that the shutter is opening, controller 25 will begin to monitor the shutter sense line for indication that the shutter has opened. Controller 25 monitors the shutter sense line every 300 microseconds for maximum of 14.1 milliseconds for a shutter sensor signal low signal. If the sensor signal does not go low, then controller 25 will display the signal "shutter error 2", but will continue the picture taking sequence. Controller 25 will then delay 20 milliseconds and will once again sense the shutter sense line for a low signal, indicating an open shutter. If the signal is still high, controller 25 will display "shutter error 3" and will abort the picture taking mode. If the shutter status signal is low, the picture-taking sequence is continued.

In parallel with monitoring the shutter, controller 25 monitors the mirror position sense line to determine whether pivotable mirror 34 has reached position 37 in back of the strobe 32. The mirror position sense line will be checked each one millisecond up a maximum of 221 milliseconds. If no indication is received in that time period that the mirror has assumed picture-taking position 37 or default, the picture taking sequence is aborted and controller 25 will command camera 12 to perform an automatic film advance and bad shot cancel on the frame aborted. Should, however, a signal be received that mirror 34 has moved into the picture taking position 37, an additional ten millisecond delay occurs allowing vibration in the pivot mirror to cease.

Once controller 25 has received indication that pivot mirror 34 is in position 37 and that camera shutter is opened, controller 25 will trigger all strobes, including subject illuminating strobes 23 as well as the transparency illuminating strobe 32 in projector 14. Controller 25 will wait four milliseconds to allow the picture to be exposed and will again check the shutter sensor line for a low signal level, indicative that the shutter has remained opened. If an indication is received that the shutter closed, the picture taking sequence will be aborted, an error message will be displayed and an automatic film advance and bad shot cancel will follow. In either event, controller 25 disables the strobes 23 and 32 and disables the shutter.

A strobe misfire detector monitors selected strobes 23 and 32. The detector pulls down the strobe sense lines within a maximum period of five milliseconds (typically 500 microseconds) after strobes 23 and 32 have been triggered if strobes 23 and 32 fire properly.

After disabling the shutter, controller 25 will monitor the shutter sensor each 300 microseconds up to a maximum of 26 milliseconds for a high signal level which indicates the shutter is closing. If the shutter is not detected closing within that period, a shutter error message is displayed and the picture taking sequence is aborted with an automatic film advance and a bad shot cancel.

If a shutter closing signal is received, controller 25 will delay fifty milliseconds and again check the shutter sensor for a low signal, indicating the shutter has fully closed. If the shutter has not fully closed, a shutter error message six will be displayed but the picture taking sequence will not be aborted.

Upon strobe disable, controller 25 will check the strobe sense line once every millisecond to determine that the strobes did fire. If the signal level does not indicate strobe firing within eleven milliseconds, the picture taking sequence will be aborted and a strobe misfire message will be displayed. Controller 25 will order an automatic film advance and bad shot cancel in this event. In normal operation, the strobe misfire line will return high within one second after it has been pulled low.

Light channel 28 generates sufficiently intense illumination to overcome environmental problems inherent in non-studio front screen projection photography. At the same time the adaptable geometry of light channel 28 allows strobe 32 to be brought into extremely close proximity to selected film transparency 27 without interfering with illumination by preview lamp 30 or loss of illuminating power. This permits using a flash tube of lower output then would otherwise be required.

Although the present invention has been described with reference to preferred embodiments, workers skilled in the art will recognize that changes may be made in form and detail without departing from the spirit and scope of the invention.

What is claimed is:

1. A front screen projection system for producing a composite optical image, including a projector for projecting a portion of the composite image from a film transparency, a camera, a directionally reflective screen for reflecting the projected portion of the composite image and a beam splitter for centering the projected portion in the field of view of the camera, the improvement comprising:
    a preview lamp in the projector for providing sustained light for illuminating the film transparency to allow projection of the projected portion;
    a light tunnel in the projector for coupling light from the preview lamp to the film transparency;
    a strobe located in the light tunnel between the film transparency and the preview lamp for briefly illuminating the film transparency at a substantially higher intensity than the preview lamp;
    means for closing the light tunnel between the strobe and the preview lamp whereby light generated by the strobe will be reflected toward the film transparency.

2. The improvement of claim 1 wherein the light tunnel closure means further comprises:
    a mirror which may be moved behind the strobe relative to the film transparency to collect light generated by the strobe and direct it toward the film transparency.

3. The improvement of claim 2 further comprising control means responsive to operator inputs for actuating the light tunnel closure means.

4. The improvement of claim 3 wherein the control means further comprises:
    electro-mechanical means responsive to appropriate actuation signals to move the tunnel closure means between its closed and open positions;
    means for indicating the position of the tunnel closure means;
    means for timing how long the tunnel closure means are in the open position;
    means for firing the strobe;
    means for monitoring whether the strobe has fired;
    key pad means for entry of operator selected commands controlling the mode that the front screen projection system enters; and
    a microcomputer for monitoring the key pad, the light tunnel closure means position indication signals and the timing means, and for transmitting actuation signals to the electro-mechanical means, and actuating the firing means;
    whereby, upon command to enter a preview mode, the microprocessor actuates the electro-mechanical means opening the light tunnel closure means, turns on the preview lamp, times the continuous length of time for which the preview lamp is on and further actuates the electro-mechanical means to close the light tunnel closure means and extinguishes the preview lamp should the length of time the preview lamp is on exceed a preselected maximum; and
    further whereby, upon command to enter a picture taking mode, the microprocessor transmits actuation signals to the electro-mechanical means to close the light tunnel closure means, monitors the position indication signals of the light tunnel closure means and actuates the means for firing the strobes upon indication of closure of the light tunnel closure means.

5. The improvement of claim 3 wherein the light tunnel closure means further comprises:
    a plate including a mirrored face;
    a pivoting mount for supporting the plate and allowing rotation of the plate into and out of the light tunnel;
    a solenoid mechanically coupled to the pivoting mount to cause rotation of the plate.

6. The improvement of claim 4 wherein the electro-mechanical means further comprises a solenoid mechanically coupled to the tunnel closure means for moving the tunnel closure means.

7. A luminaire for projecting from a selected film transparency a portion of a composite image in a front screen projection system, the improvement comprising:
    means for focusing the image recorded on the selected film transparency when illuminated on a surface outside of the luminaire;
    a first source of light for illuminating the selected film transparency;
    a source of strobed light for briefly illuminating the selected film transparency at much higher intensity than said first source;
    a light guide for coupling light from the first source to the selected film transparency to illuminate the selected film transparency, the light guide including a fixed partially reflective surface situated to reflect visible light from the first source through the strobe source to the selected film transparency and adapted to pass most of the infrared radiation from the first source without reflection; and pivotable mirror means for collecting light from the strobed source to illuminate the selected film transparency.

8. The improvement of claim 7 wherein the pivotable mirror means comprises:

means for uncoupling the optical path between the first light source and the selected film transparency; and means for cooperating with the partially reflective surface to collect light generated by the strobe source to illuminate the selected film transparency.

9. The improvements of claim 8 wherein the uncoupling means comprises:

an opaque door means rotatable about an axis to abut at an angle thereof against the partially reflective surface to block the optical path between the first light source and the film transparency.

10. The improvement of claim 9 wherein the cooperating means a mirrored surface on the face of the opaque door whereby closing the optical path with the door moves the mirrored surface behind the strobe source relative to the selected film transparency.

11. A luminaire for projecting a background image from a selected film transparency for a composite scene in a front screen projection system, the improvement comprising:

means for holding the selected film transparency;

lens means for projecting the image recorded on the selected transparency when illuminated onto a surface outside of the luminaire;

a preview lamp for illuminating the selected transparency;

a light guide defining an optical path between the preview lamp and the film transparency:

a strobe in the light guide and on the optical path between the preview lamp and the selected transparency for illuminating the selected transparency; and means for closing the light guide between the strobe and the preview lamp for substantially increasing the portion of light emitted by the strobe directed to illuminating the selected transparency.

12. A method of producing a composite optical image in the field of view of a camera including at least a first projected image, the method comprising the steps of:

positioning a projector with respect to the camera such that the optical axis of the projector and the optical axis of the camera intersect at a right angle;

positioning a first film transparency at a determinable location in the projector for illumination;

illuminating the first film transparency with a first level of illumination for projecting an image from the first film transparency;

using a beam splitter for directing projection of the image from the first film transparency;

using a beam splitter for directing projection of the image onto the optical axis of the camera;

reflecting the image to the camera along the optical axis of the camera;

establishing focus through the projector of the image from the first film transparency;

introducing successive film transparencies to the projector at the determinable location wherein any image projected from a successive film transparency is in focus;

actuating the camera for viewing a composite image including the projected image from a selected film transparency; and illuminating the selected film transparency at a second, more intense, level of illumination upon actuation of the camera;

the first level of illumination being provided by a first lamp and illumination at the second level of illumination being provided by a strobe disposed between the film transparency and the first lamp; and the step of illuminating the transparency at the second level including the substeps of, partially enclosing the strobe with mirrors for directing luminous flux generated thereby to illuminate the selected film transparency; and firing the strobe upon indication that the strobe has been partially enclosed and the camera actuated.

13. In a system for producing composite optical images in a preview mode and a photograph recording mode for previewing and photographing the composite optical images with a still camera, a method for projecting images from a projector comprising the steps of:

positioning the projector with respect to the camera such that the optical axis of the projector and the optical axis of the camera intersect at a right angle;

positioning a first film transparency at a determinable location in the projector for illuminating;

illuminating the first film transparency at a preview level of illumination in the preview mode for projecting an image;

using a beam splitter for directing projection of the image onto the optical axis of the camera;

reflecting the projected image off a surface back to the camera along its optical axis;

establishing focus of the projected image from the first film transparency through the projector;

introducing successive film transparencies to the projector at the determinable location whereby any image projected from a successive film transparency is in focus;

illuminating the successive film transparencies in the preview mode;

monitoring the duration of each instance of the preview mode;

terminating the preview mode when time in the preview mode equals a first predetermined maximum; and preventing entry into the preview mode where total time in the preview mode equals a second predetermined maximum over an immediately preceding period.

14. In a method as set forth in claim 13, wherein the preview level of illumination in the preview mode is provided by a lamp and a photograph level of illumination in the photograph recording mode is provided by a strobe disposed between the selected film transparency and the lamp, the method including the additional steps of:

actuating the still camera to enter the photograph making mode;

monitoring opening of the camera shutter;

partially enclosing the strobe with movable mirrors to direct luminous flux therefrom toward a selected film transparency;

monitoring partial enclosure of the strobe;

firing the strobe upon indication of an opened shutter and completed partial enclosure of the strobe; and closing the camera shutter to terminate the photograph making mode.

* * * * *

UNITED STATES PATENT AND TRADEMARK OFFICE
CERTIFICATE OF CORRECTION

PATENT NO. : 4,847,645

DATED : July 11, 1989

INVENTOR(S) : Karl J. Kallenberg et al.

It is certified that error appears in the above-identified patent and that said Letters Patent is hereby corrected as shown below:

Column 9, line 22, after "means", insert --comprises--.

Column 9, line 38, after "strobe", insert --located--.

Signed and Sealed this

Twenty-fourth Day of April, 1990

Attest:

HARRY F. MANBECK, JR.

Attesting Officer

Commissioner of Patents and Trademarks